V. Munck,
Planing and Matching Machine.

N°16,849. Patented Mar. 17, 1857.

UNITED STATES PATENT OFFICE.

VALENTINE MUNCK, OF CARROLLTON, LOUISIANA.

MACHINE FOR PLANING TAPERING STAVES.

Specification of Letters Patent No. 16,849, dated March 17, 1857.

*To all whom it may concern:*

Be it known that I, VALENTINE MUNCK, of Carrollton, in the parish of Jefferson and State of Louisiana, have invented a new and useful Improvement in Planing-Machines; and I do hereby declare that the following is a full, clear, and exact description of the construction and operation of the same, reference being had to the annexed drawings, forming part of this specification, in which—

Figure 1:
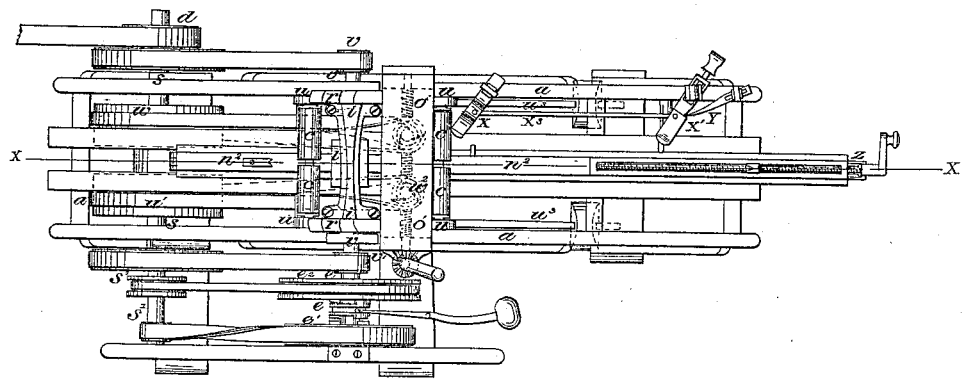
Figure 2:
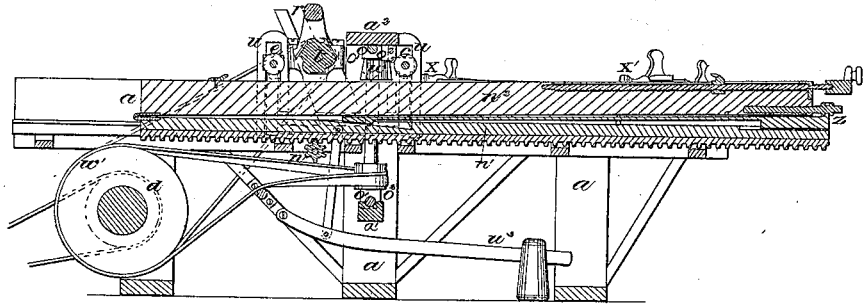
Figure 3:
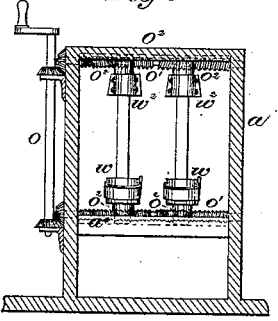
Figure 4:
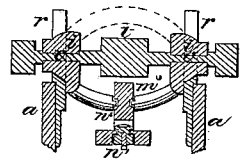

Figure 1 is a top view of the machine. Fig. 2 is a vertical longitudinal section on line $x$ $x$. Fig. 3 is a skeleton cross section showing side cutters. Fig. 4 is a sectional view showing connection of table with bearing of upper cutter head.

Similar letters of reference in the several figures denote the same parts.

The machine here considered is better adapted to the planing of staves than any other kind of lumber, the principle of the invention consisting in cutting the staves any desired taper with perfect regularity.

The nature of my invention consists in constructing the bed on which the lumber is secured, of two longitudinal sections placed one above the other; the upper section being capable of assuming any desired inclination with respect to the other, and having such connection with the bearing of the face cutter head that the relative position of the cutters and face of the bed shall remain the same under all circumstances of change of inclination of the bed; there being in connection with this bed and face cutter, inclined side cutters with constant inclination which by the variation of the inclination of the bed are enabled to vary the taper imparted to the edge of the lumber.

The details of construction and operation are as follows—In the drawing $a$ is the frame of the machine. The table on which the lumber is placed to be planed marked $n'$ and $n^2$, is made in sections seen in Fig. 2 and is made to move by the rack on the lower surface of $n'$, driven by the pinion $n$, on shaft $e$; as seen in Fig. 2, the rollers $c$ that confine the lumber to the table work in guides $u$, and are operated on by weighted levers $u^3$, also seen in Fig. 2. The shaft $o$ is mounted to frame $a$ and made to turn the screws $o'$ as seen by Fig. 3 to carry the side cutters marked $w^2$, seen in same figure, these screws acting on boxes $o^2$, have each a part right hand, and a part left hand threads; said boxes $o^2$, making the center for shafts of the side cutters $w^2$, to run in, and are guided in grooves in the sections of the frame of the machine, marked $a'$ and $a^2$, as seen by Fig. 2; the shafts of the side cutters have pulleys $w$, and are driven by the pulleys $w'$ on shaft $s$.

X and X' are adjustable arms mounted on the frame to confine lumber from moving on the table $n^2$, and the rod $X^3$, connecting said arms to have their movements the same. The catch Y holding them in position. The band running over $s'$, and $e'$, is crossed to cause a reverse movement of shaft $e$, from that given by $s^2$, driving $e^2$—$d$, pulley by which the band that drives the machine acts, mounted on shaft $s$. $v$, shaft on which cutting head $t$ is mounted driven by pulleys $v'$—$r$, guides in which shaft $v$, with frame $e$, are mounted. It will be seen that $n^2$, is attached to $n'$ by a hinge at one end, and the key $z$ at the other end, passing between the sections of the table operated by a screw, elevating $n^2$, from $n'$, and in carrying the lumber past the cutting head it is made to have a regular change of position to the side cutting heads; and the angular form they have, cuts the lumber in a uniform taper, as well as cuts the lower side narrower than the upper side. $n^2$, has a groove extending its whole length on each side, and in this groove the lower branches of the frame of cutting head $t$ slides, as seen at $m^3$, Fig. 4, keeping the cutting head $t$ in same position relative to upper face of the table $n^2$.

The lumber is carried under the face cutters by the traversing bed, the groove and tongue connection shown at $m^3$, causing the said cutter head bearings to rise with the inclination of the table $n^2$, and thereby under all circumstances preserve the same relative position of said table and the edges of the cutters, the inclination of the table $n^2$, regulates the taper of the lumber operated upon.

After this my description of this invention what I claim as new and desire to secure by Letters Patent, is—

1. The adjustable table $n'$, and $n^2$, and making said table guide the cutting head $t$, substantially as and for the purposes set forth.

2. I also claim in combination with table $n'$ and $n^2$, and cutting head $t$, the angular side cutting heads $w^2$, to secure from the variation of the table $n^2$, tapered planing on the edges of the lumber, substantially as specified.

In testimony whereof, I have hereunto signed my name before two subscribing witnesses.

VALENTINE MUNCK.

Witnesses:
C. F. BRUNK,
FRANCIS ARMSTRONG.